United States Patent
Cadeddu

[19]

[11] Patent Number: 5,878,578
[45] Date of Patent: Mar. 9, 1999

[54] HYDRAULIC PRESSURE GENERATOR WITH VIBRATION DAMPING

[75] Inventor: Leonardo Cadeddu, Crema, Italy

[73] Assignee: Robert Bosch Sistemi Frenanti Spa, Crema, Italy

[21] Appl. No.: 700,461

[22] PCT Filed: Sep. 4, 1996

[86] PCT No.: PCT/EP96/03880

§ 371 Date: Sep. 13, 1996

§ 102(e) Date: Sep. 13, 1996

[87] PCT Pub. No.: WO97/18115

PCT Pub. Date: May 22, 1997

[30] Foreign Application Priority Data

Nov. 14, 1995 [IT] Italy .................................. TO95A0915

[51] Int. Cl.[6] .................................................... F15B 7/10
[52] U.S. Cl. .................................. 60/592; 92/51; 92/52; 92/60
[58] Field of Search .................. 60/592; 91/173; 92/51, 52, 60

[56] References Cited

U.S. PATENT DOCUMENTS 3,955,371  5/1976  Bueler ........................................ 60/592

*Primary Examiner*—F. Daniel Lopez
*Attorney, Agent, or Firm*—Leo H. McCormick, Jr.; Warren Comstock

[57] ABSTRACT

A hydraulic pressure generator having a body (1) with a first bore (11) therein for receiving a cylinder (21) of a piston assembly (2) to define a pressure chamber (12). The cylinder (21) has a second bore (211) for receiving an auxiliary piston (22) which defines a variable volume compensation chamber (23). The compensation chamber encloses a deformable member (5) which is adapted to exert an elastic force between the auxiliary piston (22) and a closed end (210) of cylinder (21). The compensation chamber (23) communicates with the pressure chamber (12) through a restriction (221) formed in a longitudinal duct (222) of the auxiliary piston (22). A sealing member (4) borne by a portion (222) of the auxiliary piston (22) closes the pressure chamber (12) such that the elastomeric member (5) dampens pressure differences between the pressure chamber (12) and compensation chamber (23).

4 Claims, 1 Drawing Sheet

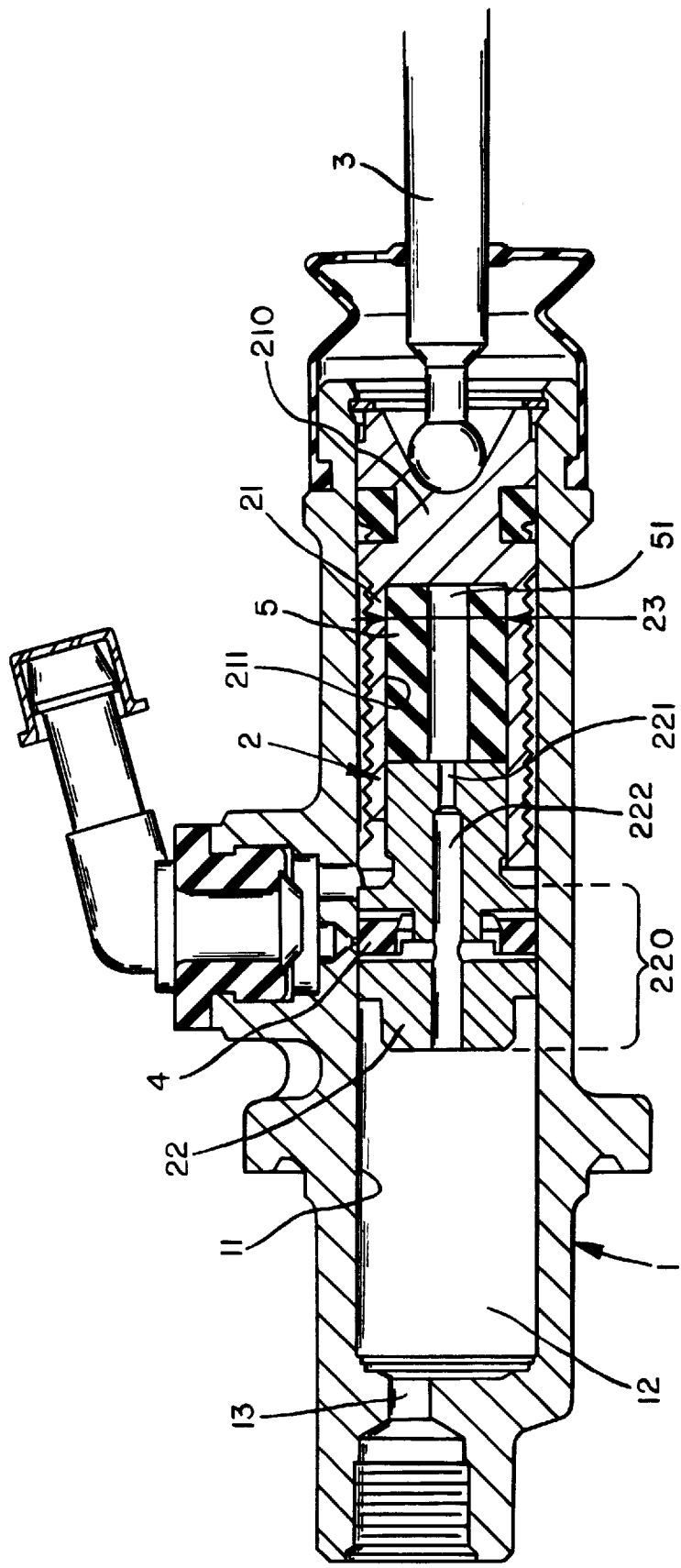

HYDRAULIC PRESSURE GENERATOR WITH VIBRATION DAMPING

The present invention relates to a hydraulic pressure generator comprising a body having a first blind cylindrical bore formed therein within which slides longitudinally a piston assembly driven by an actuating rod and bearing a seal member which defines, within the first bore, a pressure chamber provided with a pressure outlet, the piston assembly comprising a cylinder having a closed end which is connected to the actuating rod and in which is formed a second bore which is open on the pressure chamber side, an auxiliary piston sliding in the second bore and defining therein a compensation chamber of variable volume which encloses a deformable member adapted to exert an elastic force between the auxiliary piston and the closed end of the cylinder.

BACKGROUND OF THE INVENTION

A device of this kind is described for example in European Pateint EP-0 318 629, which relates to a pressure generator which is suitable in particular for the hydraulic actuation of the clutches of automobile vehicles.

When a hydraulic pressure generator is used as a master cylinder for the clutch of an automobile vehicle, the axial vibration of the drive shaft, connected to the clutch assembly, gives rise to mechanics and hydraulics vibrations which are transmitted through the clutch slave cylinder to the master cylinder and consequently to the pedal, producing a disagreeable sensation for the driver.

Although the patent cited above specifically has as an object to propose means for reducing these vibrations, and even though the device described in this patent does indeed have significant qualities from this point of view, the characteristic curve of the output pressure produced by the device against the displacement of the piston assembly has a region of non linearity which is undesirable in certain particular circumstances.

SUMMARY OF THE INVENTION

The present invention is placed in this context and has as an object to provide a hydraulic pressure generator in which the mechanics and hydraulics variations are damped efficiently, but whose characteristic curve exhibits greater linearity.

To this end, a hydraulic pressure generator according to the present invention is essentially characterized in that the compensation chamber communicates with the pressure chamber through a restriction formed in a longitudinal duct in the auxiliary piston, in that a first portion of the auxiliary piston remains outside the second bore, and in that the sealing member is borne by the first portion of the auxiliary piston.

According to a preferred embodiment of the invention, the deformable member comprises a sleeve of elastomeric material, having a longitudinal passage positioned facing the duct formed in the auxiliary piston.

BRIEF DESCRIPTION OF THE DRAWINGS

Other features and advantages of the invention will appear clearly from the following description thereof, given by way of non limitative example, with reference to the single figure of the accompanying drawings, which is a sectional view of a pressure generator in accordance with the invention.

DETAILED DESCRIPTION OF THE DRAWING

As shown in the drawing this pressure generator comprises essentially a body 1, and a piston assembly 2, the piston assembly being driven by an actuating rod 3, and itself consisting of a cylinder 21 and an auxiliary piston 22.

The piston assembly 2 slides longitudinally in a first blind cylindrical bore 11 formed in the body 1, and bears a sealing member 4 which defines, within this first bore 11, a pressure chamber 12 provided with a pressure outlet 13.

The cylinder 21 has a closed end 210 which is connected to the actuating rod 3.

In addition, the cylinder 21 is formed with a second bore 211 which is open on the side of the pressure chamber 12 and within which slides the auxiliary piston 22.

The auxiliary piston 22 defines, within the second bore 211, a compensation chamber 23 of variable volume, which encloses a deformable member 5 adapted to exert an elastic force between the auxiliary piston 22 and the closed end 210 of the cylinder 21.

In accordance with the invention, the compensation chamber 23 communicates with the pressure chamber 12 through a restriction 221 formed in a longitudinal duct 222 in the auxiliary piston 22.

In addition, a portion 220 of the auxiliary piston, which bears the sealing member 4, remains outside the second bore 211.

Lastly, in accordance with a preferred embodiment of the invention, the deformable member 5 takes the form of a sleeve of elastomeric material, having a longitudinal passage 51 positioned facing the restriction 221 formed in the auxiliary piston 22.

With this arrangement, the instantaneous difference between the pressures prevailing respectively in the compensation chamber 23 and in the pressure chamber 12 is dependent on the frequency of the pressure variations in the chamber 12, this difference otherwise being zero in the absence of such variations.

In fact, any pressure oscillation in the pressure chamber 12 produces an oscillation of the auxiliary piston 22 relative to the cylinder 21, which causes the volume of hydraulic fluid present in the compensation chamber 23 to oscillate as well, the energy associated with the pressure variations in the pressure chamber 12 thus being dissipated by the deformation of the sleeve 5 and by the forced flow of hydraulic fluid through the restriction 22 1.

The axial compression of the sleeve 5 generates a radial deformation of the sleeve towards the longitudinal passage 51, partially resisted by the hydraulic pressure and the pressure vibrations occurring in the chamber 12 and transmitted through the duct 222 and the restriction 221.

I claim:

1. A hydraulic pressure generator comprising:
    a body having a first blind cylindrical bore formed therein;
    a piston assembly which slides longitudinally within said first blind cylindrical bore and is driven by an actuating rod, said piston assembly bearing a sealing member which defines a pressure chamber within said first bore, said pressure chamber having with a pressure outlet, said piston assembly comprising a cylinder having a closed end which is connected to said actuating rod, said cylinder having a second bore which is connected to said pressure chamber;
    an auxiliary piston which slides in said second bore to define a variable volume compensation chamber therein;
    a deformable member located in said variable volume which is adapted to exert an elastic force between said auxiliary piston and a closed end of said cylinder, characterized in that: said compensation chamber communicates with said pressure chamber through a restriction formed in a longitudinal duct in said auxiliary piston; said auxiliary piston has a first portion which is located outside of said second bore; and said sealing member is borne by said first portion of said auxiliary piston.

2. The hydraulic pressure generator according to claim 1, wherein said deformable member consists essentially of a sleeve of elastomeric material, said sleeve having a longitudinal passage positioned to face said restriction formed in said auxiliary piston.

3. The hydraulic pressure generator according to claim 2 wherein axial compression of said sleeve generates a radial deformation of said sleeve towards said longitudinal passage, said radial deformation being partially resisted by hydraulic pressure and pressure variations prevailing in said chamber and transmitted through said duct and restriction.

4. The hydraulic pressure generator according to claim 1 wherein said deformable member consists essentially of a sleeve of elastomeric material, having a longitudinal passage; and wherein axial compression of said sleeve generates a radial deformation of said sleeve towards said longitudinal passage, said radial deformation being partially resisted by hydraulic pressure and pressure variations prevailing in said chamber and transmitted through said duct and restriction.

* * * * *